(12) United States Patent
Smith

(10) Patent No.: US 12,287,044 B2
(45) Date of Patent: Apr. 29, 2025

(54) VALVE INDICATOR AND RELATED METHODS

(71) Applicant: Kevin S. Smith, Metairie, LA (US)

(72) Inventor: Kevin S. Smith, Metairie, LA (US)

(*) Notice: Subject to any disclaimer, the term of this patent is extended or adjusted under 35 U.S.C. 154(b) by 0 days.

(21) Appl. No.: 18/389,046

(22) Filed: Nov. 13, 2023

(65) Prior Publication Data

US 2024/0077146 A1 Mar. 7, 2024

Related U.S. Application Data

(63) Continuation of application No. 17/299,068, filed as application No. PCT/US2019/065070 on Dec. 6, 2019, now abandoned.

(60) Provisional application No. 62/776,655, filed on Dec. 7, 2018.

(51) Int. Cl.
F16K 37/00 (2006.01)

(52) U.S. Cl.
CPC ...... F16K 37/0008 (2013.01); F16K 37/0016 (2013.01); F16K 37/0041 (2013.01)

(58) Field of Classification Search
CPC ............. F16K 37/0008; F16K 37/0041; F16K 37/0016; F16K 37/0033
See application file for complete search history.

(56) References Cited

U.S. PATENT DOCUMENTS

| | | | |
|---|---|---|---|
| 1,994,336 A * | 3/1935 | Dawson | F16K 41/00 137/553 |
| 2,028,696 A | 1/1936 | Beckwith | |
| 2,530,164 A * | 11/1950 | Harshbarger | F16K 37/0016 137/553 |
| 3,002,529 A | 10/1961 | Bowman | |
| 3,239,616 A | 3/1966 | Rosenston | |
| 6,079,441 A * | 6/2000 | Miller | F16K 37/0041 137/554 |
| 6,237,626 B1 | 5/2001 | Wilkins | |
| 6,471,182 B1 | 10/2002 | McIntosh | |
| 2009/0151619 A1* | 6/2009 | Murray | G01D 5/2073 116/284 |
| 2017/0097106 A1 | 4/2017 | Clark et al. | |

FOREIGN PATENT DOCUMENTS

| | | |
|---|---|---|
| GB | 172084 A | 11/1921 |
| GB | 429686 A | 6/1935 |
| GB | 446582 A | 5/1936 |
| WO | 0120263 A1 | 3/2001 |

OTHER PUBLICATIONS

PCT International Search Report from priority PCT Application No. PCT/US2019/065070; mailed Feb. 25, 2020; 3pp.

* cited by examiner

*Primary Examiner* — Atif H Chaudry

(74) *Attorney, Agent, or Firm* — Adams & Reese LLP; John Henry Scott, III

(57) ABSTRACT

A device for indicating the position of a valve including a mechanical mechanism and output device. A related method for indicating the position of a valve including operatively connecting the device to a valve such as a manual valve. A mechanical mechanism for use with a valve is also described herein. An output device for use with a valve is also described herein.

14 Claims, 12 Drawing Sheets

VALVE INDICATOR AND RELATED METHODS

CROSS-REFERENCE TO RELATED APPLICATIONS

This application is a continuation-in-part application of U.S. Non-Provisional application Ser. No. 18/089,143 filed Dec. 27, 2022, which claims the benefit of U.S. Non-Provisional application Ser. No. 17/299,068, filed on Jun. 2, 2021, which claims the benefit of U.S. 371 PCT/US2019/065070, filed on Dec. 6, 2019, which claims the benefit of U.S. Provisional Application No. 62/776,655, filed on Dec. 7, 2018. The above patent applications are incorporated here by reference in its entirety to provide continuity of the disclosure.

STATEMENT REGARDING FEDERALLY SPONSORED RESEARCH OR DEVELOPMENT

Not applicable.

FIELD

The present disclosure generally relates to devices for indicating a position of a valve and related methods.

BACKGROUND

This section introduces information that may be related to or provide context for some aspects of the subject matter described herein and/or claimed below. This information is background facilitating a better understanding of that which is disclosed herein. Such background may include a discussion of "related" art. That such art is related in no way implies that it is also "prior" art. The related art may or may not be prior art. The discussion is to be read in this light, and not as admissions of prior art.

Some position indicators known in the art suffer from disadvantages. For example, linearly moving indicators, in which a movement of the valve stem or spindle is linearly translated into a movement of the valve position indicator (e.g., "rising stem indicator"), can lead to a very uncertain positioning of the indicator and thus not be suitable fit for use in automated systems.

Thus, a need exists for devices and methods to for providing an indication of the position of a valve, for example, a valve such as a manual rising stem gate or wedge valve.

SUMMARY

In general, the present disclosure provides a device for indicating the position of a valve and related methods.

In an aspect, the device includes a mechanical mechanism and output device. The mechanical mechanism includes (i) a first gear configured to operatively connect to the valve; (ii) a second gear coupled to a first end portion of a first support, wherein the second gear is sized and configured so as to mate with the first gear; (iii) a third gear coupled to a second end portion of the first support; (iv) a fourth gear coupled to a first end portion of a second support, wherein the fourth gear mates with the third gear; and (v) a support member for supporting the first support and the second support, and adapted to affix the mechanical mechanism to the valve. The output device is operatively connected to the mechanical mechanism. The output device is further configured provide a signal that is indicative of the position of the valve.

One or more aspects include the device of any preceding paragraph in which the output device is operatively connected to a second end portion of the second support.

One or more aspects include the device of any preceding paragraph in which the output device comprises one selected from the group consisting of a rotary sensor, two limit switches, a quarter turn indicator, and any combination of two or more of the foregoing.

One or more aspects include the device of any preceding paragraph in which the output device is operatively connected to the second end portion of the second support with a coupling and a flexible shaft.

One or more aspects include the device of the preceding paragraph in which the flexible shaft has a length in the range of from about 1 to about 20 feet.

One or more aspects include the device of any preceding paragraph in which the device for indicating the position of the valve is operatively coupled to a hand wheel of the valve so as to provide a signal that is indicative of the position of the valve when the valve is actuated.

One or more aspects include the device of any preceding paragraph in which a longitudinal axis of the second gear is substantially orthogonal relative to a longitudinal axis of the first gear.

One or more aspects include the device of any preceding paragraph in which a longitudinal axis of the third gear is substantially orthogonal relative to a longitudinal axis of the fourth gear.

One or more aspects include the device of any preceding paragraph in which the output device comprises a rotary sensor coupled to the second end portion of the second support, wherein the rotary sensor has a number of turns in the range of from about 50 to about 100 turns and transmits a signal indication of a position of the manual valve.

One or more aspects include the device of any preceding paragraph in which the mechanical mechanism is positioned adjacent or below a hand wheel of the valve.

One or more aspects include the device of any preceding paragraph in which a position indicator sensor is operatively connected to the output device and receives the signal that is indicative of a position of the valve and in response to the signal provides an indication of the position of the valve.

One or more aspects include the device of any preceding paragraph in which a wireless position indicator sensor is operatively connected to the output device and receives the signal that is indicative of a position of the valve and in response to the signal provides an indication of the position of the valve.

In another aspect, the present disclosure provides a method for indicating the positon of a valve. The method includes operatively connecting the device of claim 1 to a valve having a hand wheel.

One or more aspects include the method of the preceding paragraph in which the device is operatively coupled to the hand wheel of the valve and positioned adjacent to or below the hand wheel of the valve.

In another aspect, the present disclosure provides a device for indicating a position of a valve. The device includes a mechanical mechanisms and an output device. The mechanical mechanism includes (i) a first gear configured to operatively connect to the valve; (ii) a second gear operatively connected to the first gear, wherein the second gear is sized and configured so as to mate with the first gear; (iii) a third gear operatively connected to the second gear; (iv) a fourth gear operatively connected to the third gear; and (v) a member for supporting the each of the gears, and adapted to affix the mechanical mechanism to the valve. The output device is operatively connected to the mechanical mechanism, wherein the output device provides a signal that is indicative of the position of the valve.

In another aspect, the present disclosure provides a mechanical mechanism for use with a valve. The mechanical mechanism includes (A) a first gear configured to operatively connect to the valve; (B) a second gear coupled to a first end portion of a first support, wherein the second gear is sized and configured so as to mate with the first gear; (C) a third gear coupled to a second end portion of the first support; (D) a fourth gear coupled to a first end portion of a second support, wherein the fourth gear mates with the third gear; and (E) a support member for supporting the first support and the second support, and adapted to affix the mechanical mechanism to the valve. The mechanical mechanism is configured to be operatively connected to an output device capable of producing a signal that is indicative of the position of the valve.

In another aspect, the present disclosure provides an output device for use with a valve. The output device includes at least one sensor comprising a rotary sensor, two limit switches, a quarter turn indicator, position indicator sensor and any combination of two or more of the foregoing. The output device is configured to receive a mechanical input as the hand wheel of the valve is operated and in response provide a signal that is indicative of the position of the valve.

One or more aspects include the device of the preceding paragraph in which a position indicator sensor that is operatively connected to the at least one sensor, wherein the position indicator sensor receives the signal that is indicative of a position of the valve and in response to the signal provides an indication of the position of the valve.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

BRIEF DESCRIPTION OF THE DRAWINGS

The claimed subject matter may be understood by reference to the following description taken in conjunction with the accompanying drawings, in which like reference numerals identify like elements, and in which:

Figure 1:
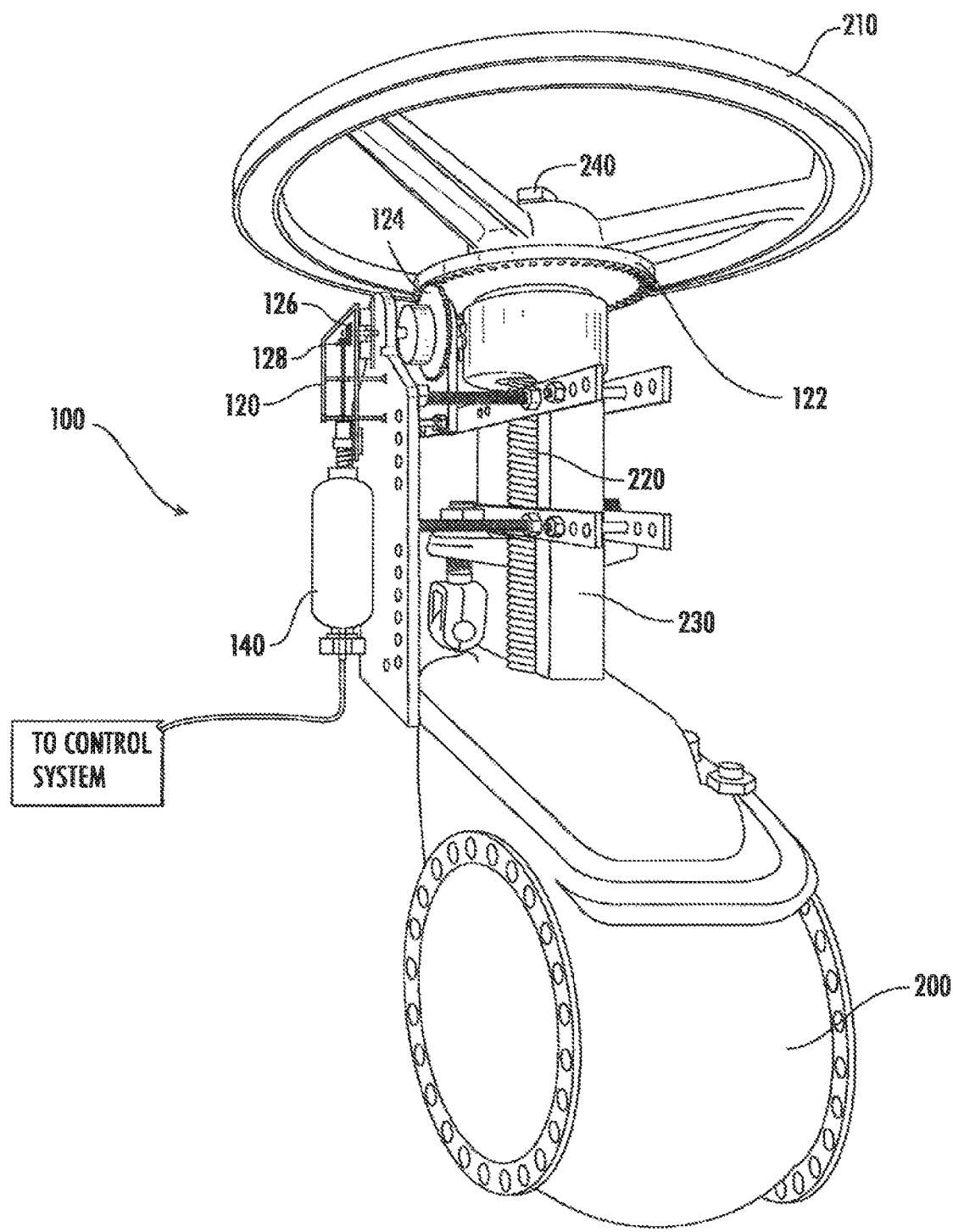
FIG. 1 illustrates a device for indicating a position of a valve according to one or more aspects of the present disclosure, in use with a manual valve.

While the claimed subject matter is susceptible to various modifications and alternative forms, the drawings illustrate specific embodiments herein described in detail by way of example. It should be understood, however, that the description herein of specific embodiments is not intended to limit the claimed subject matter to the particular forms disclosed, but on the contrary, the intention is to cover all modifications, equivalents, and alternatives falling within the spirit and scope as defined by the appended claims.

Definitions

To define more clearly the terms used in this disclosure, the following definitions are provided. Unless otherwise indicated, the following definitions are applicable to this disclosure. To the extent that any definition or usage provided by any document incorporated here by reference conflicts with the definition or usage provided herein, the definition or usage provided in this disclosure controls.

In this disclosure, features of the subject matter are described such that, within particular aspects, a combination of different features can be envisioned. For each and every aspect and each and every feature disclosed herein, all combinations that do not detrimentally affect the devices, systems, processes, or methods described herein are contemplated with or without explicit description of the particular combination. Additionally, unless explicitly recited otherwise, any aspect or feature disclosed herein can be combined to describe inventive devices, systems, processes, or methods consistent with the present disclosure.

In this disclosure, while devices and methods are often described in terms of "comprising" various components or steps, the devices and methods can also "consist essentially of" or "consist of" the various components or steps, unless stated otherwise. For example, a device for indicating a position of a valve consistent with aspects of the disclosed subject matter can comprise; alternatively, can consist essentially of; or alternatively, can consist of the various components, unless stated otherwise. Similarly, a method for indicating a position of a valve consistent with aspects of the disclosed subject matter can comprise; alternatively, can consist essentially of; or alternatively, can consist of the various steps, unless stated otherwise. For example, a device for indicating a position of a valve consistent with aspects of the disclosed subject matter can comprise; alternatively, can consist essentially of; or alternatively, can consist of, the indicated components thereof.

The terms "a," "an," and "the" are intended to include plural alternatives, e.g., at least one, one or more, and one or more than one, unless otherwise specified.

The term "gear" refers to a toothed machine part, such as a wheel or cylinder, that meshes or mates with another toothed part to transmit motion or to change speed or direction.

Although any methods and materials similar or equivalent to those described herein can be used in the practice or testing of the subject matter described herein, the typical methods and materials are herein described.

All publications and patents mentioned herein are incorporated herein by reference for the purpose of describing and disclosing, for example, the constructs and methodologies that are described in the publications, which can be used in connection with the presently described subject matter.

Various numerical ranges are disclosed herein. When a range of any type is disclosed or claimed herein (e.g., "ranging from . . . ", "in a range of from . . . ", "in the range of from . . . ") the intent is to disclose or claim individually each possible number that such a range could reasonably encompass, including end points of the range as well as any sub-ranges and combinations of sub-ranges encompassed therein, unless otherwise specified.

The term "about" means that amounts, sizes, parameters, and other quantities and characteristics are not and need not be exact, but may be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. Whether or not modified by the term "about," the claims include equivalents to the specified quantities.

DETAILED DESCRIPTION

Illustrative aspects of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

I. Device for Indicating a Position of a Valve

Aspects of the disclosed subject matter are directed to a device 100 for indicating a position of a valve, for example, an indication that the valve 200 is in an open position, a closed position, and/or provide a percent of the open or closed position.

In an aspect, the device 100 for indicating a position of a valve 200 comprises a mechanical mechanism 120 and output device 140. The device 100 for indicating a position of a valve 200 disclosed herein provides advantages, at least one of which is that it can utilize the existing hand wheel 210 of the valve 200 (e.g., a valve such as a manual rising stem gate or wedge valve) thereby avoiding replacement or modification of the valve or the hand wheel of the valve.

Figure 2:
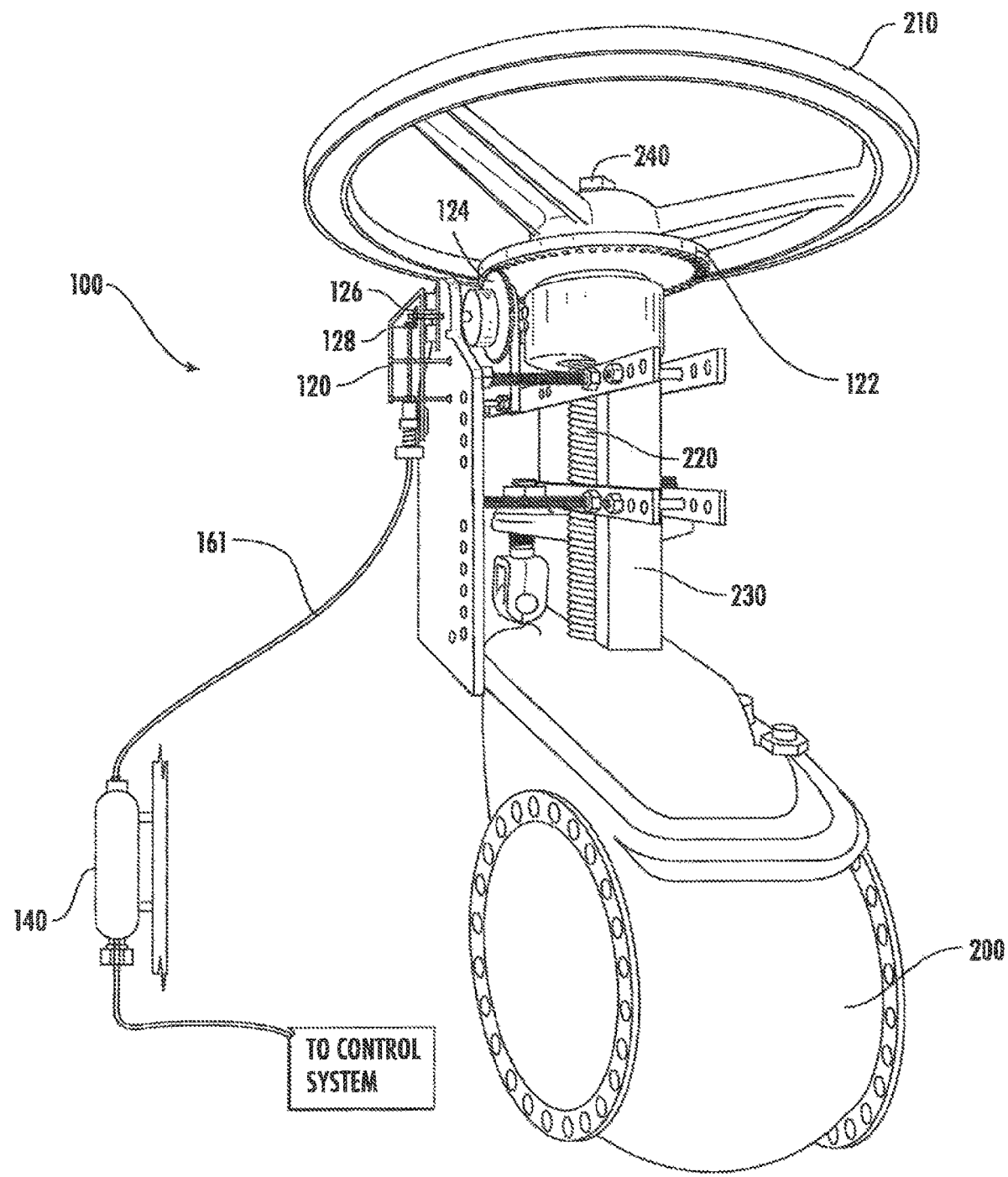
FIG. 2 illustrates a device for indicating a position of a valve according to one or more aspects of the present disclosure, in use with a manual valve.
Figure 3:
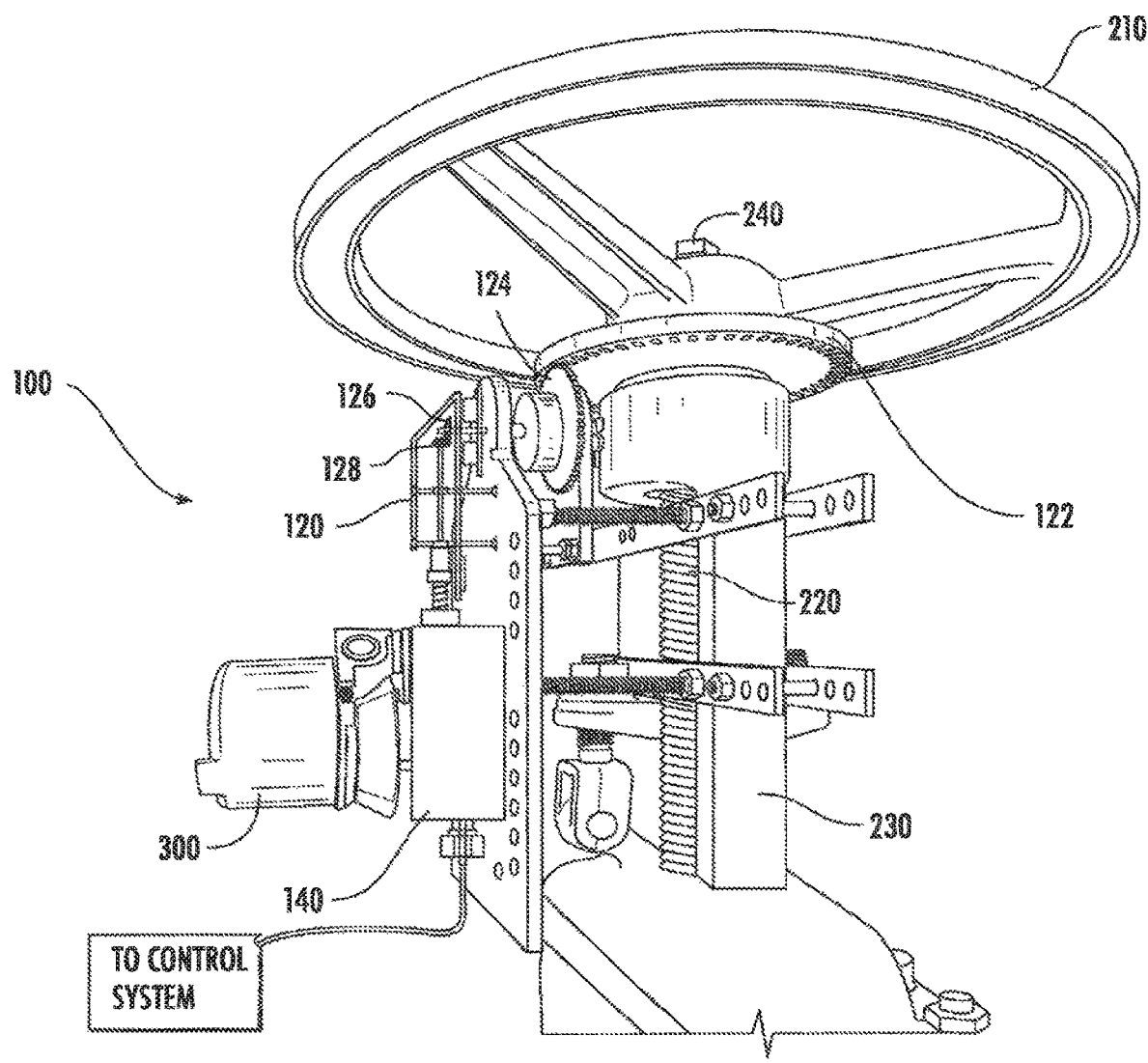
FIG. 3 illustrates a device for indicating a position of a valve according to one or more aspects of the present disclosure, in use with a manual valve.
Figure 4:
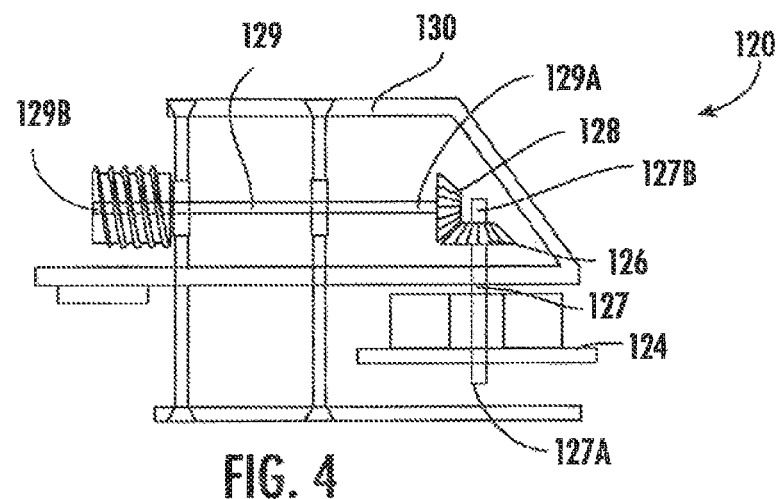
FIG. 4. illustrates a side view of a mechanical mechanism according to one or more aspects of the present disclosure.
Figure 5:
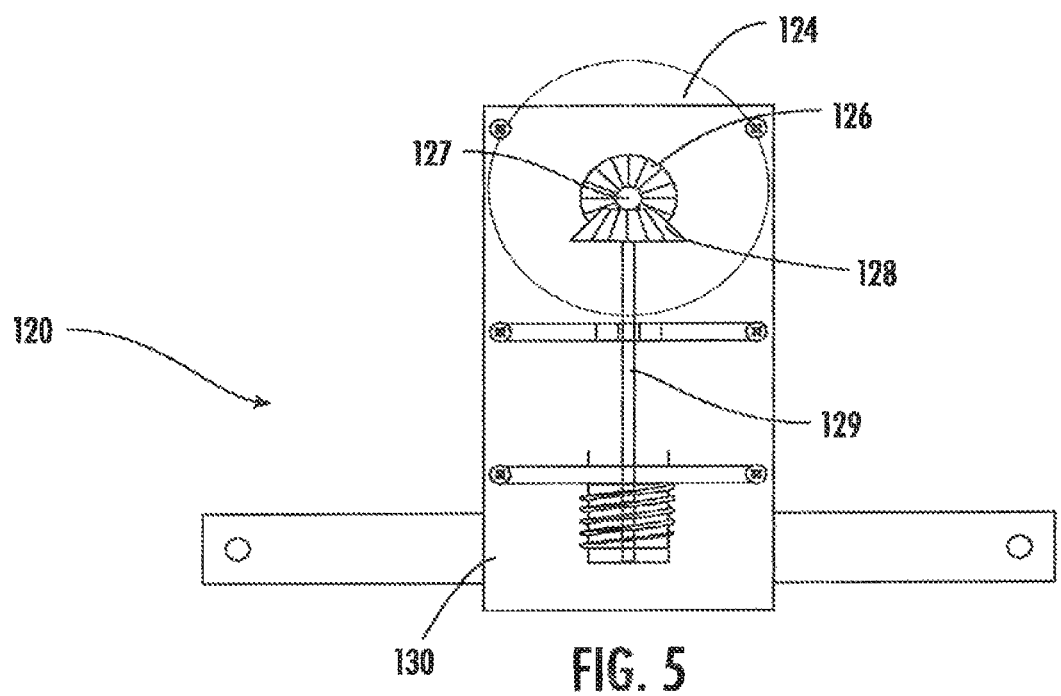
FIG. 5 illustrates top view of the mechanical mechanism shown in FIG. 4.

As shown in FIG. 1 and FIG. 3, in an aspect the mechanical mechanism 120 is mounted locally on a valve 200 underneath the hand wheel 210 of the valve 200. The output device 140 can also be mounted locally where the valve 200 is installed using one or more fasteners, or the output device 140 can be configured to be mounted in a remote location (e.g., about 10 to about 20 feet from the valve) as needed and operatively connected to the mechanical mechanism 120 via a flexible shaft 161 as shown in FIG. 2. The output device 140 can be operatively connected to a control system using a wired connection, a wireless connection, or both.

A1. Mechanical Mechanism

The mechanical mechanism 120 comprises a first gear 122, a second gear 124, a third gear 126, and a fourth gear 128. The mechanical mechanism 120 may further comprise a mounting support member 130, such as a mounting bracket or plate, for supporting the second gear 124, third gear 126, and fourth gear 128. The mounting support member 130 is further adapted so as to affix the mechanical mechanism 120 to the valve 200 (e.g., the yoke 230 of the valve 200) using one or more fasteners.

As illustrated in FIGS. 1-3 and FIGS. 18-19, the first gear 122 is sized and configured so as to be mounted directly below the hand wheel 210 of the valve 200, without requiring replacement of the native hand wheel 210. The first gear 122 may be a disc defining an aperture 123 configured to accommodate and permit the first gear to be operatively connected to the hand wheel 210 of a valve 200. The aperture 123 defined by the first gear 122 may include a notch 123a for engaging the hand wheel 210 with the internal stem nut (not shown) of the valve 200. The first gear 122 may be secured beneath the hand wheel valve 200 by placing a key of the valve 200 within the notch 123a defined by the first gear 122. The notch 123a is configured to engage the hand wheel 210 with the internal stem nut of the valve 200, and a fastener 240, such as a lock nut, is used to secure the hand wheel 210 to the valve 200. Thus, the hand wheel 210, when turned, engages the internal stem nut. The internal stem nut is internally threaded, matching the threads of the stem 220 of the valve 210. Turning the hand wheel the internal stem nut raises (opens) or lowers (closes) the stem 230 and gate assembly. The notch 123a of the first gear 122 is an integral part and/or extension of the hand wheel function, and configured to be installed between the hand wheel and yoke. The first gear 122 is secured in place by the fastener 240.

The first gear 122 also defines one or more holes or indentations 125 on its surface (e.g., one or more cylindrically shaped grooves), which are configured to mate with the second gear 124. The first gear 122 is positioned relative to the valve 200 so as to rotate about an axis of rotation that is parallel or substantially parallel to the axis of rotation of the hand wheel 210 of the valve 200, when the hand wheel 210 is operated. The thickness (t) of the first gear 122 and the diameter (d) of the aperture 123 defined by the first gear 122 depends on the size of the valve 200. In an aspect, the thickness of the first gear 122 is in the range of from about 0.172 inches to about 0.25 inches, and the diameter of the aperture 123 is in the range of from about 1.25 inches to about 2.625 inches.

The second gear 124 is coupled to a first end portion 127*a* of a first support 127, and is configured and positioned so as to mate with the one or more holes or indentations 125 on the surface of the first gear 122. The second gear 124 is positioned so that a longitudinal axis of the second gear 124 is in a perpendicular or substantially perpendicular position relative to the longitudinal axis of the first gear 122. The second gear 124 may comprise one or more teeth configured to mate with the holes or indentations 125 of the first gear. The second gear may also be positioned relative to the valve to permit access to a grease plug of the valve 200 and to provide adequate clearance between the first gear 122 and the hand wheel 210 of the valve 200 to permit a person to operate the hand wheel 210. As the hand wheel 210 of the valve 200 is rotated during operation, the first gear 122 rotates which in turn rotates the second gear 124 and the first support 127 about an axis of rotation that perpendicular or substantially perpendicular to the axis of rotation of the first gear 122.

The third gear 126 is coupled to a second end portion 127*b* of the first support 127, and is configured and positioned so as to mate the fourth gear 128. Thus, in an aspect, the third gear 126 is positioned so that a longitudinal axis of the third gear 126 is in a parallel or substantially parallel position relative to the longitudinal axis of the second gear 124. The third gear 126 is also positioned so that the longitudinal axis of the third gear 126 is in a perpendicular or substantially perpendicular position relative to the longitudinal axis of the fourth gear 128. As hand wheel 210 of the valve 200 is operated, the first gear 122 moves the second gear 124, which rotates the first support 127 causing movement or rotation of the third gear 126. The third gear 126 is preferably a right angle gear to permit the device to be positioned close to the body of the valve 200 and to allow room for a person to operate the hand wheel 210 of the valve 200.

The fourth gear 128 is coupled to a first end portion of a second support 129, and is configured to mate with the third gear 126. Thus, when the hand wheel 210 of the valve 200 is operated, the first gear 122 moves the second gear 124, which causes rotation or movement of the first support 127 resulting in rotation of the third gear 126, which in turn moves or rotates the fourth gear 128 and the second support 129. The second end portion 129*b* of the second support 129 may include a threaded connection to permit the mechanical mechanism 120 to be operatively connected to the output device 140. The fourth gear 128 is preferably a right angle gear to permit the device to be positioned close to the body of the valve and to allow room for a person to operate the hand wheel 210 of the valve 200.

The mounting support member 130 is provided allow the mechanical mechanism 120 to be affixed to the valve 200 using one or more fasteners. The mounting support member 130 is also configured to provide support for the components of the mechanical mechanism 120. In an aspect, the mounting support member 130 can be enclosed within or form part of a housing to protect the components of the mechanical mechanism 120 from wear or damage.

A2. Output Device

The output device 140 is configured to receive an input as the hand wheel 210 of the valve 200 is operated and in response provide a signal that is indicative of the position of the valve 200. For example, the output device 140 may be operatively connected to the mechanical mechanism 120 so as to receive a mechanical input from the mechanical mechanism 120. The output device 140 can be connected to the mechanical mechanism 120 and positioned so that is located at or near the installation location of the valve 200. Alternatively, the output device 140 can be positioned and mounted at a remote distance from the mechanical mechanism 200 and the valve 200 by using a remote mounting assembly 160 to comprising a flexible shaft 161. For example, a first end portion of the flexible shaft 161 of the remote mounting assembly may be connected to the second end portion 129*b* of the second support 129 of the mechanical mechanism using a coupling. The flexible shaft 161 may have a length in the range of from about 1 to 40 feet, preferably 5-30 feet, more preferably 10-20 feet. A second end portion of the flexible shaft 161 is operatively connected to the output device 140 described herein.

In an aspect, as the hand wheel 210 of the valve 200 is turned, each of the gears 122, 124, 126, 128 of the mechanical mechanism 120 moves or rotates so as to cause the output device 140 to produce a signal that is indicative of the position of the valve 200. The output device 140 can transmit the signal to a control system via a wired or wireless connection.

In an aspect, the output device 140 can be mounted within an enclosure, which is securely attached to the valve using one or more fasteners. For example, the output device 140 may be attached to the yoke of the valve 200 with a bracket using bolts.

As described more fully below, the output device 140 can be configured in a variety of ways, depending on the service the requirements of the particular valve used in connection with the device (e.g., the physical size of the body of the valve below its hand wheel, the surrounding environment, operating conditions, safety considerations, integration requirements of certain controls systems, and so forth).

A2i. Rotary Sensor

Figure 6:
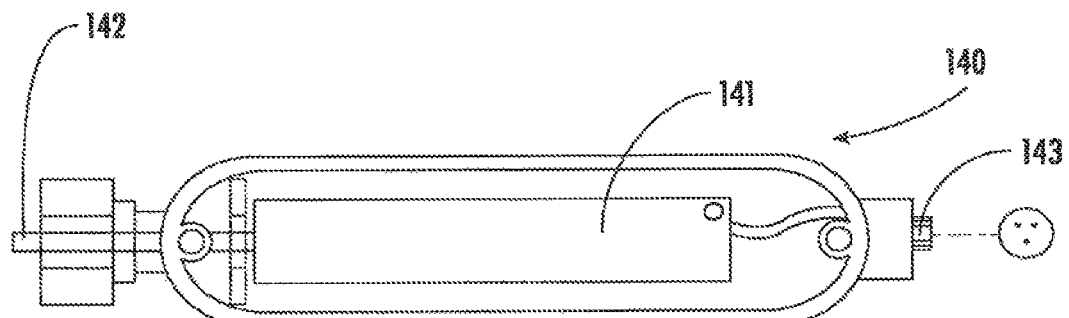
FIG. 6 illustrates a top cutaway view of an output device according to one or more aspects of the present disclosure.
Figure 7:
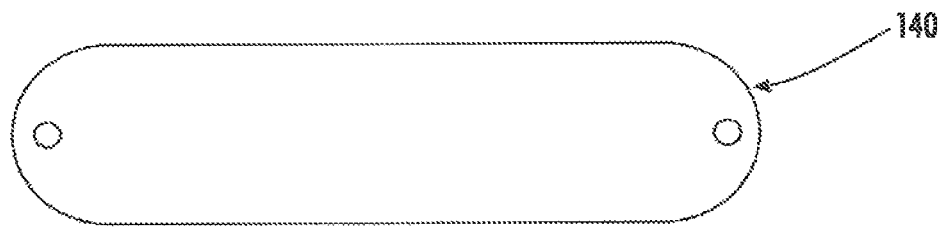
FIG. 7 illustrates a top external view of the output device shown in FIG. 6.
Figure 8:
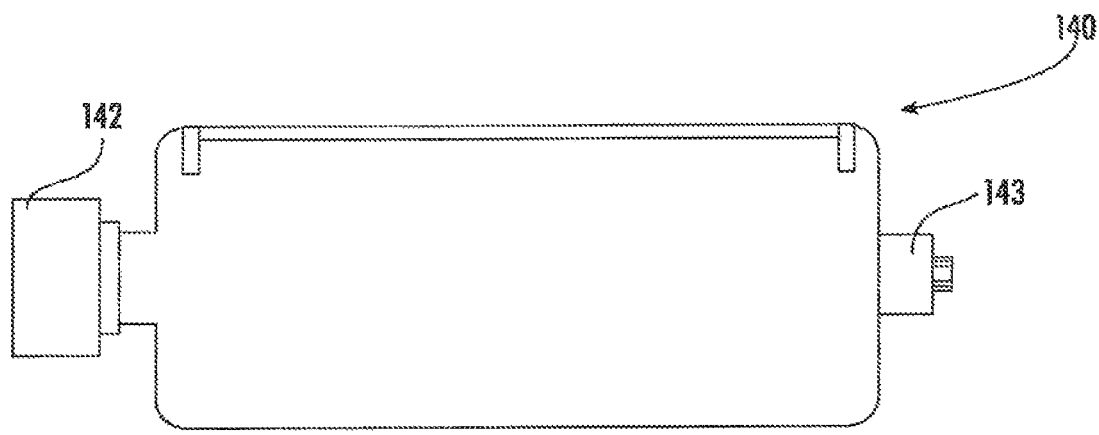
FIG. 8 illustrates a side view of the output device shown in FIG. 6.

As illustrated in FIGS. 6-8, in an aspect, the output device 140 may comprise at least one rotary sensor 141 configured to produce a signal that is indicative of the position of the valve in the range of from 0% (fully closed position) to 100% (fully open position). For example, the rotary sensor 141 may be an ultra-compact rotary sensor having a number of turns in the range of from about 50 turns to about 100 turns (or 18,000 deg to 36,000 deg) capable of transmitting a resistive output of about 10 kohms. The rotary sensor 141 is mounted on a shaft 142 and operatively connected to the mechanical mechanism 120, for example, via the second end portion 129*b* of the second support 129 by a threaded connection. The output device 140 may also include an output connection 143 to enable the output device 140 to be operatively connected to a control system via a wired connection, a wireless connection, or both. In this manner, the signal that is indicative of the position of the valve (i.e., resistive output from the rotary sensor) is sent to the control system. Examples of suitable rotary sensors that may comprise the output device include without limitation ML50 Rotary Sensor, which is commercially available from Novotechnik/Contelec AG having address of 155 Northboro Road, Southborough, Massachusetts 01772.

A2i. Open and Close Limit Switch

Figure 9:
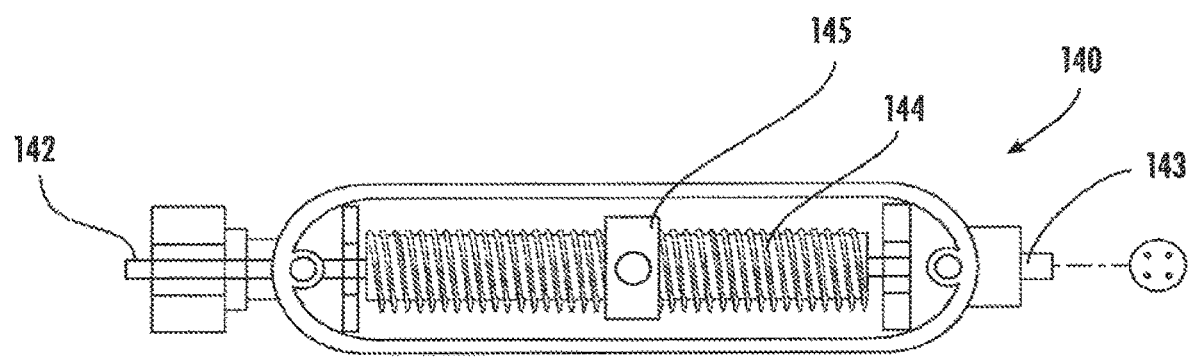
FIG. 9 illustrates a top cutaway view of an output device according to one or more aspects of the present disclosure.
Figure 10:
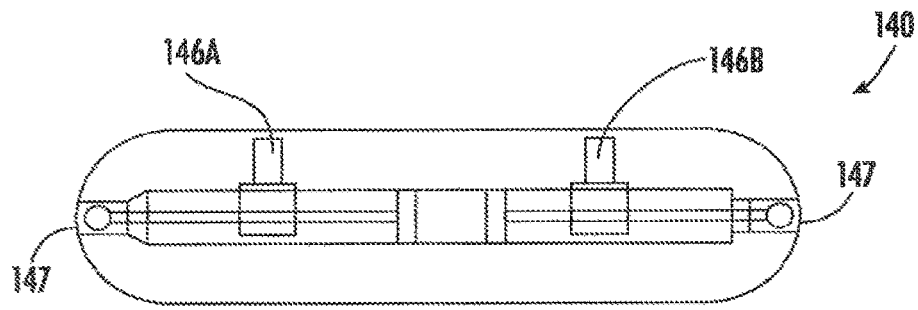
FIG. 10 illustrates a side cutaway view of the output device shown in FIG. 9.
Figure 11:
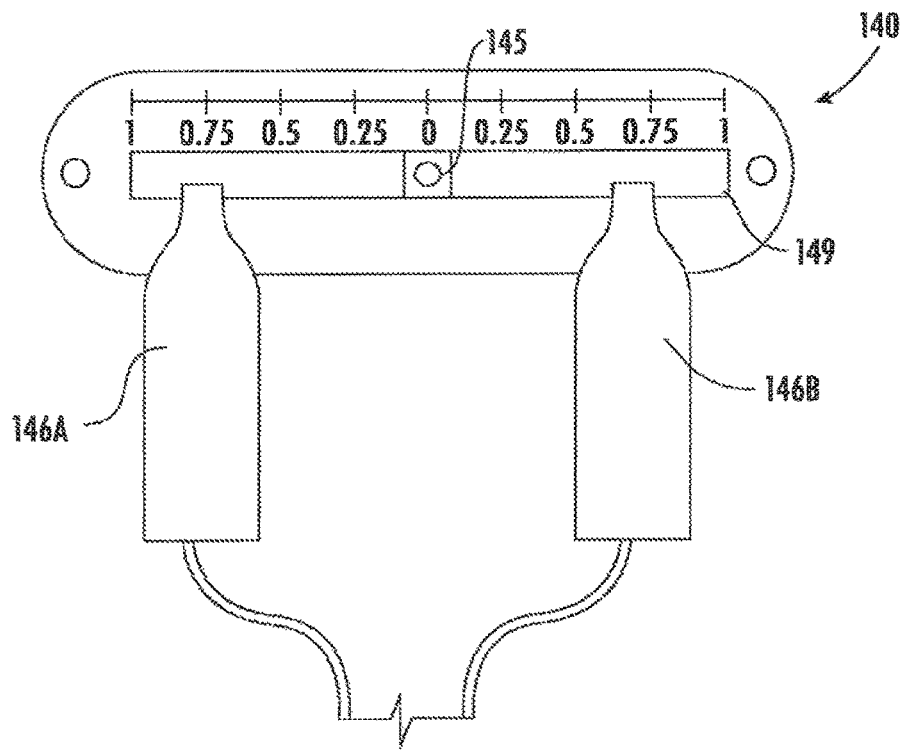
FIG. 11 illustrates a side view of the output device shown in FIG. 9 used in connection with certain Reed switch sensors.

As illustrated in FIGS. 9-11, in an aspect, the output device may comprise an auger 144 (e.g., a threaded bolt), an actuator 145 (e.g., a nut) that turns along the auger 144, and one or more switches 146 configured to be actuated by the actuator 145. The second end portion 129b of the second support 129 of the mechanical mechanism 120 is connected to the shaft 142 of the output device. Thus, as the second support 129 of the mechanical mechanism 120 rotates or moves as the hand wheel 210 of the valve 200 is operated, the shaft 142 of the output device 140 rotates the auger 144 so as to cause linear movement of the actuator 145 along the auger 144.

The actuator 145 is configured to interface with the one or more switches 146 so as to produce a signal that is indicative of the position of the valve. In an aspect, the actuator 145 may comprise a lever or magnet. In an embodiment, the output device 140 includes at least a first switch 146a and a second switch 146b. Each switch 146a, 146b is capable of producing a digital signal for indicating that the valve 200 is in the fully closed position or the valve is in the fully open position. The first switch 146a may be positioned at a first end portion of the auger 144 and the second switch 146b may be positioned at a second end portion of the auger. One switch is set to indicate an open position of the valve and the other switch is set to indicate a closed position of the valve. Thus, as the hand wheel 210 of the valve 200 is turned in a clockwise or counter-clockwise direction, the auger 144 turns and the actuator 145 moves in a linear direction along the auger 144. In this manner, the actuator 145 mechanically or magnetically actuates the first switch 146a and/or second switch 146b thereby producing a signal indicative of the position of the valve.

The output device 140 may also include one or more adjustment mechanisms 147, such as a screw, for setting the one or more limit switches 146 to the fully open position and/or fully closed position without opening the output device for ease of operation and protection from the outside operating environment. The adjustment mechanism 147 can be positioned at the first end portion of the shaft 142, the second end portion of the shaft 142, or both the first end portion of the shaft and second end portion of the shaft 142. The output device 140 may also include a connector 143 to enable the one or more switches 146a, 146b of the output device 140 to be operatively connected to a control system via a wired connection, a wireless connection, or both.

In an aspect, as shown in FIG. 11, the switches can be positioned external to the housing of the output device 140. The housing can define a slot 149 that permits the actuator 145 to operate the switches 146a, 146b. For example, where the actuator includes a magnet, the slot 149 permits the actuator to magnetically operate the switches thereby sending the signal to the control system using a wired connection, wireless connection, or both. The slot 149 of the housing can be provided with a clear plastic window. Such a configuration can allow the output device 140 to be used in connection with various commercially available switches. Examples of suitable switches that may comprise the output device 140 include without limitation a linear position switch sensor such as AccuTrak™ Silver Bullet Position Sensor 316, which is commercially available from Westlock Controls having an address of 280 N Midland Avenue, Suite 258, Saddle Brook, New Jersey, 07663.

A2iii. Rotary Sensor and Open and Close Limit Switch (Combination)

Figure 12:
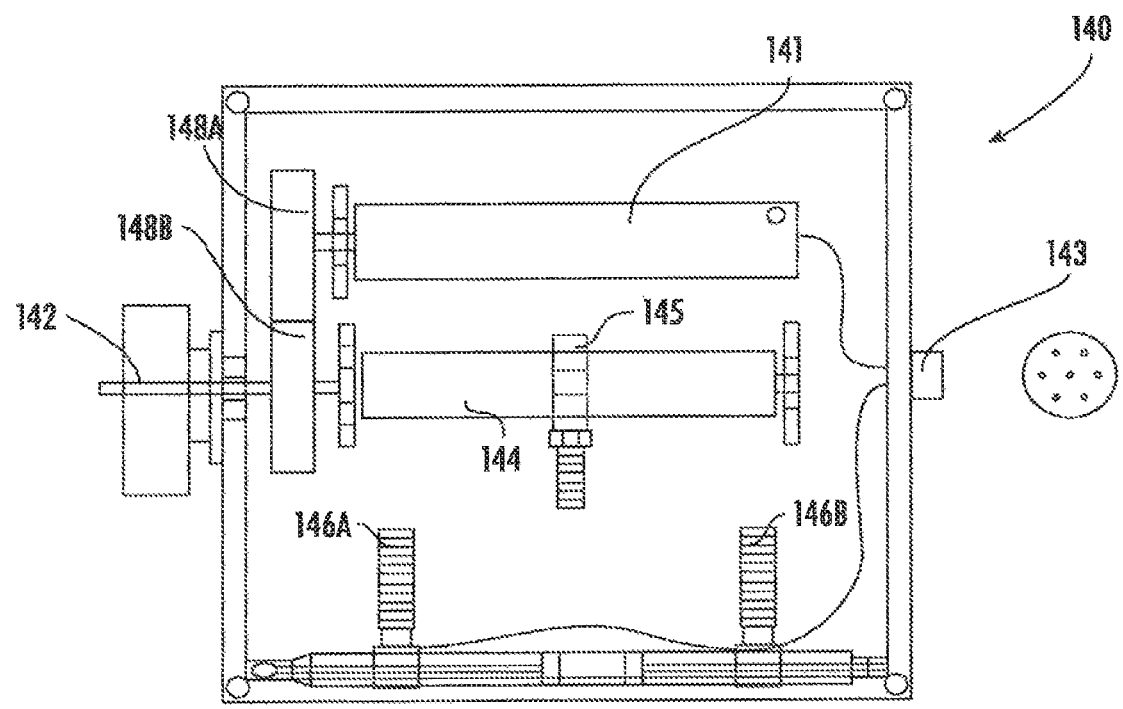
FIG. 12 illustrates a top cutaway view of an output device according to one or more aspects of the present disclosure.
Figure 13:
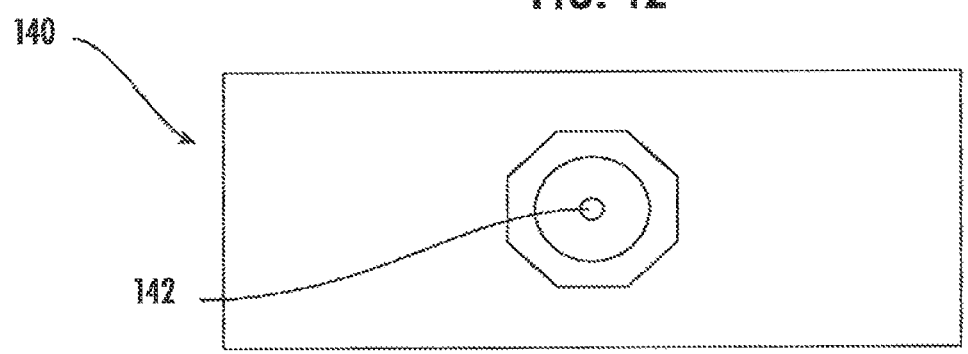
FIG. 13 illustrates a front view of the output device shown in FIG. 12.
Figure 14:
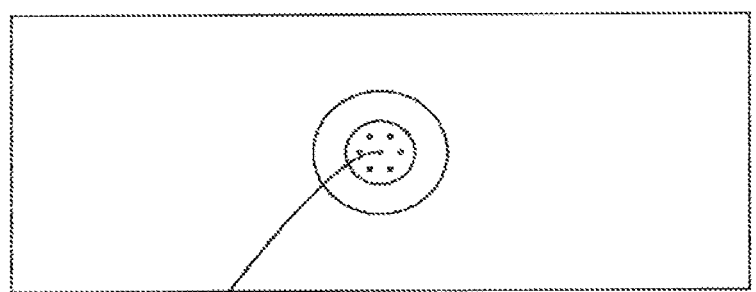
FIG. 14 illustrates a rear view of the output device shown in FIG. 12.

As illustrated in FIGS. 12-14, in an aspect, the output device 140 may comprise a rotary sensor 141 and one or more limit switches 146 in combination, which are operatively connected to one another so as to produce and transmit two types of signals (i.e. both analog and digital signals) to a control system or wireless sensor. The rotary sensor 141 and the one or more limit switches 146 may be operatively connected to each other using gears 148, such as two teeth gears having about 32 teeth. In this manner, the output device 140 produces both an analog and digital signal that can be transmitted to a control system via a wired connection, wireless connection, or both.

A2iv. Quarter-Turn Open Close Indicator (Local Indicator)

Figure 15:
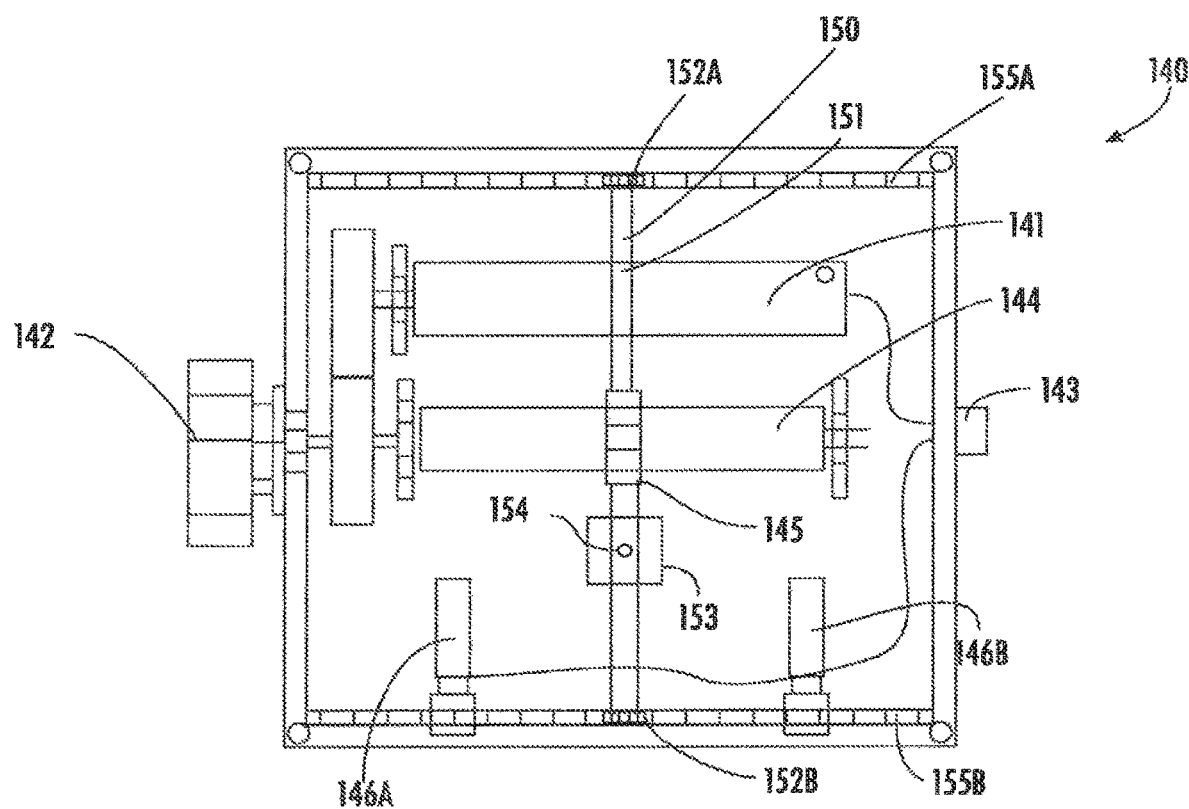
FIG. 15 illustrates a top cutaway view of an output device according to one or more aspects of the present disclosure.
Figure 16:
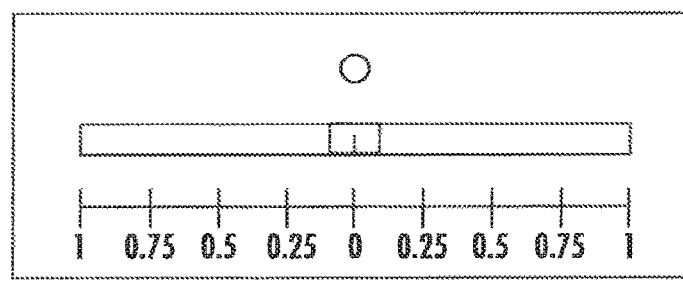
FIG. 16 illustrates a side view of the output device shown in FIG. 15, and illustrates a visual scale.
Figure 17:
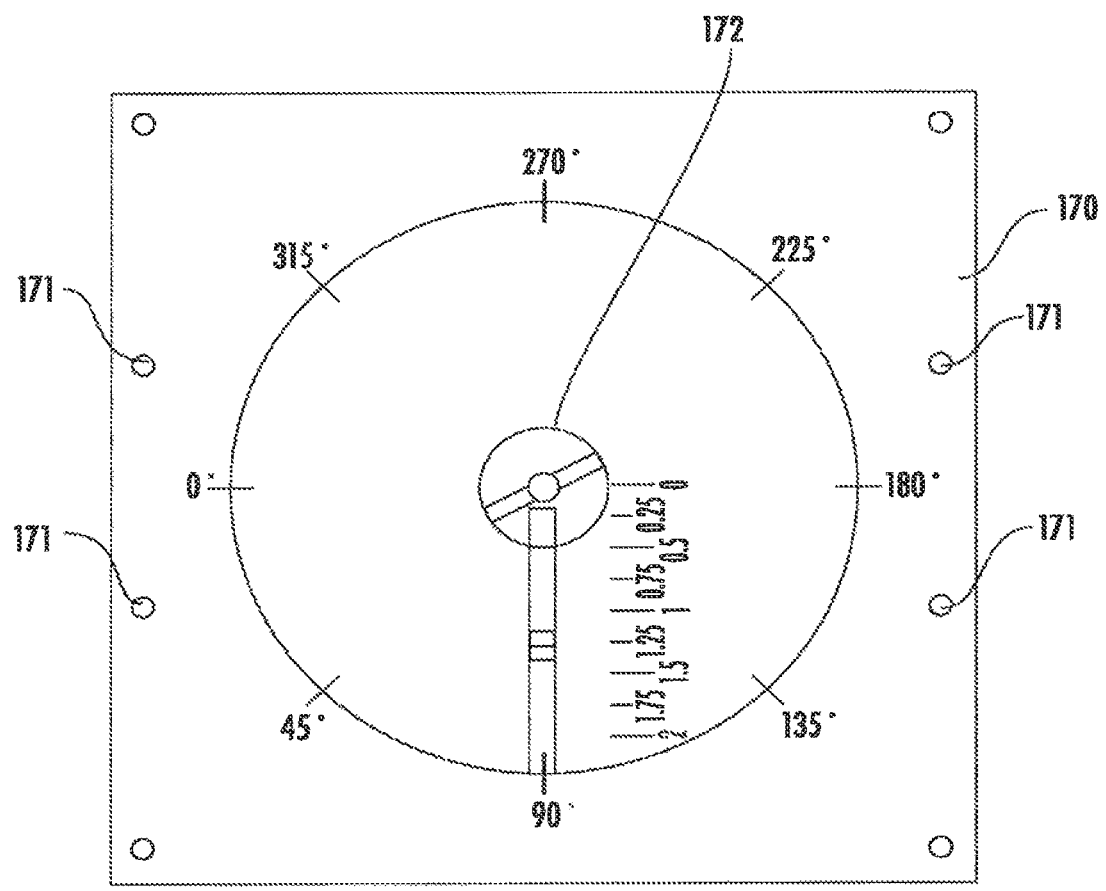
FIG. 17 illustrates a top view of the output device shown in FIG. 15, with a top adapter plate.
Figure 18:
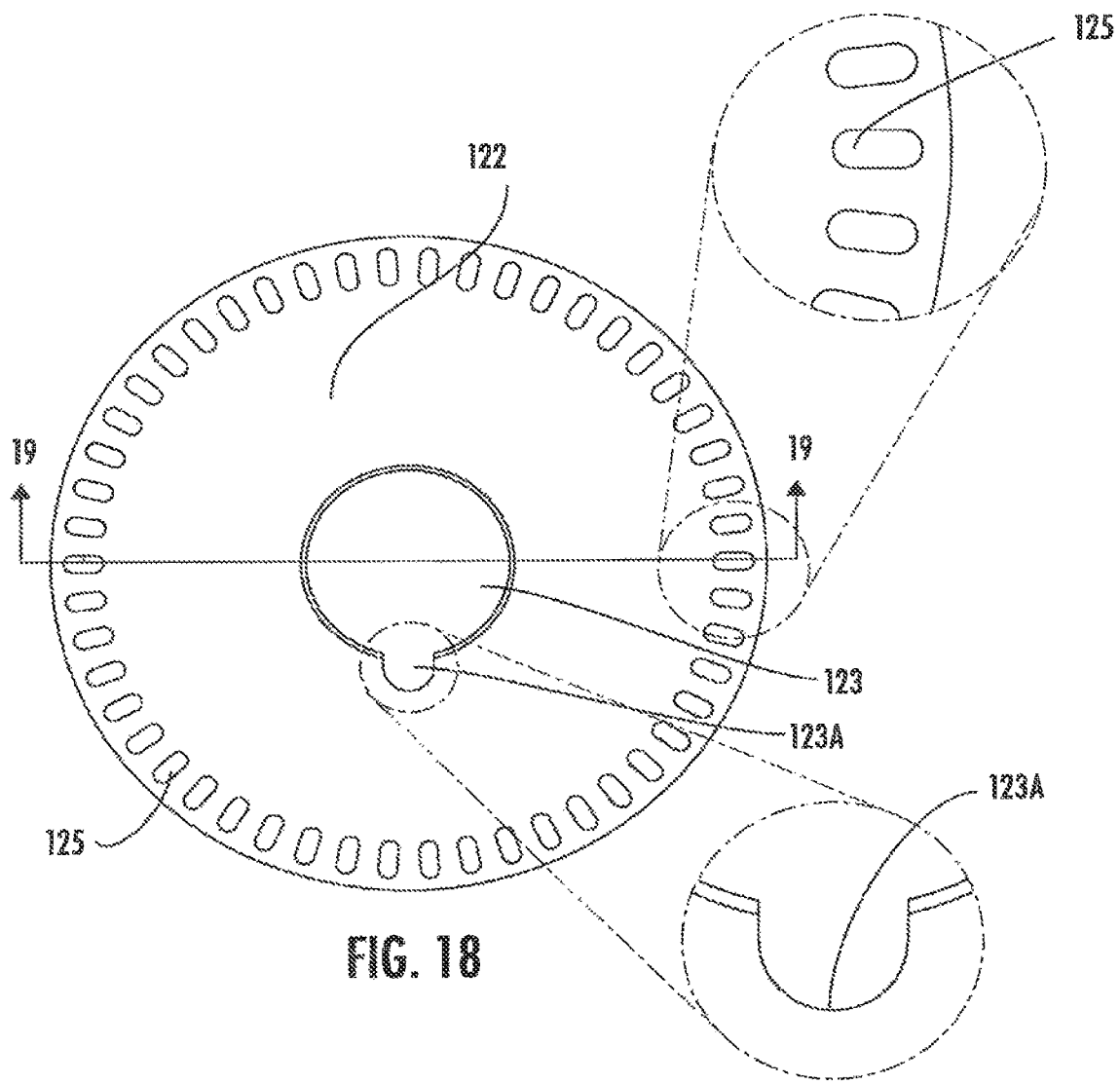
FIG. 18 illustrates a first gear of a mechanical mechanism according to one or more aspects of the present disclosure.
Figure 19:
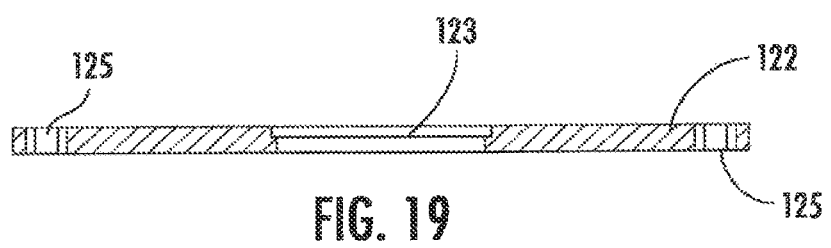
FIG. 19 illustrates a side cross-sectional view of the first gear of a mechanical mechanism shown in FIG. 18.
Figure 20:
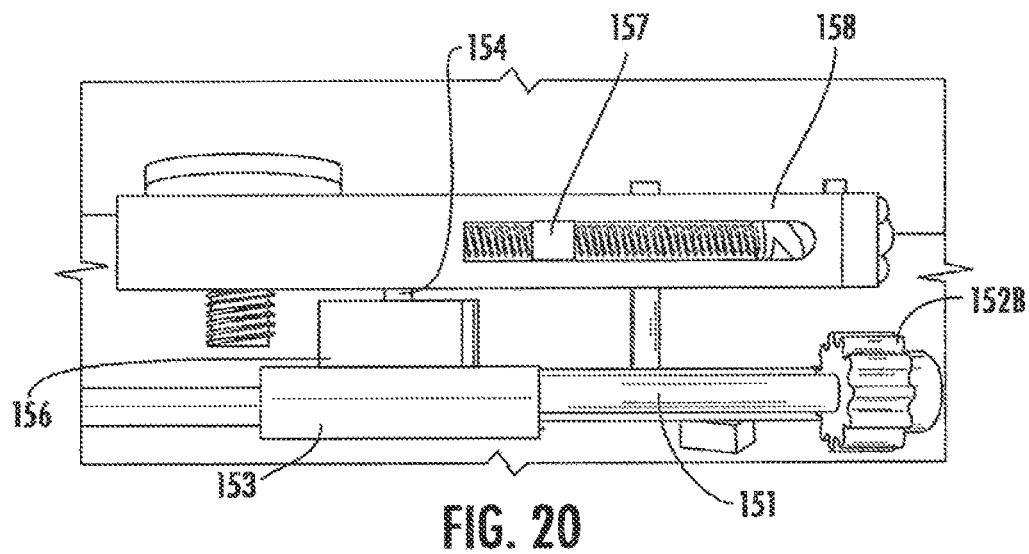
FIG. 20 illustrates a side cutaway view of the output device shown in FIG. 17.
Figure 21:
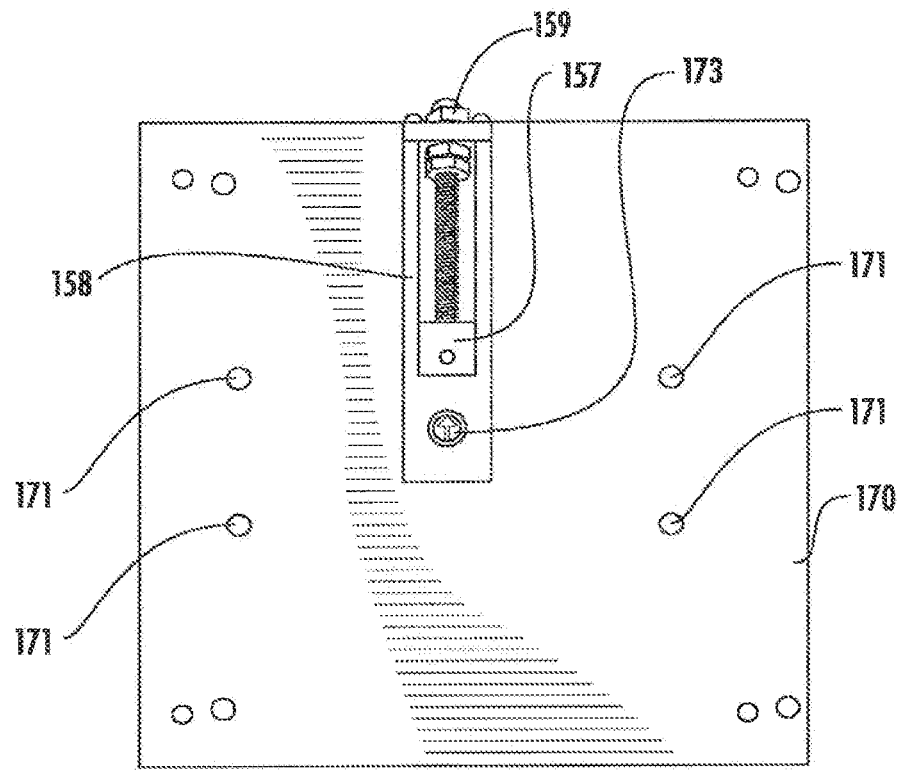
FIG. 21 illustrates a bottom view of the adapter plate shown in FIG. 17.
Figure 22:
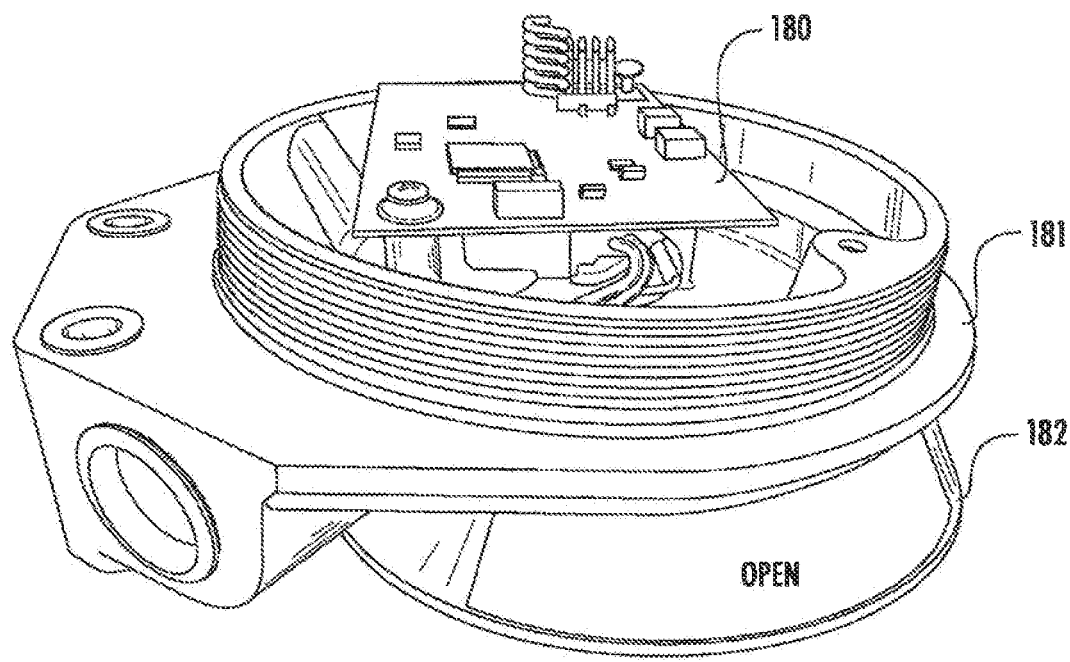
FIG. 22 illustrates a wireless valve position indication sensor positioned or embedded within a visual indicator mounted on a NAMUR 1 adapter.
Figure 23:
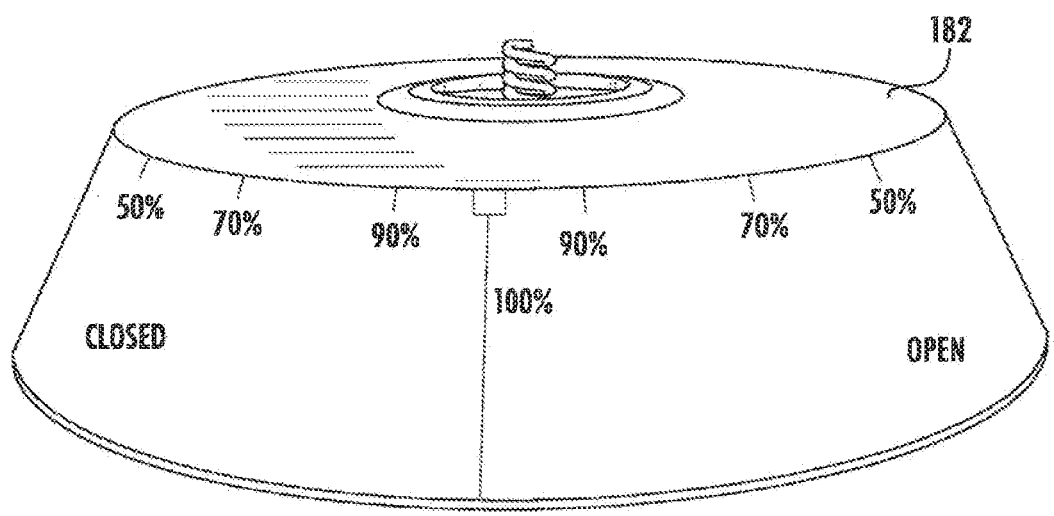
FIG. 23 illustrates a visual indicator mounted that may be connected to a NAMUR 1 adapter.

With reference to FIGS. 15-17, in an aspect, the output device 140 may comprise a quarter-turn indicator comprising an auger 144 (e.g., a threaded bolt), and an actuator 145 (e.g., a nut) that moves linearly along the shaft, and a guide 150 that is configured to move linearly with the actuator. This embodiment provides the capability to permit the device 100 to provide a visual location of the position of the valve at the location where the valve 200 is installed. The guide 150 comprises a support member 151, such as a bar or slider, having a gear 152 attached at each of its ends, and a carriage 153 that is connected to the support member with pin 154. The guide 150 has a gear 152a, 152b attached to each end of the support member 151. Each gear 152a, 152b is configured to move along a respective track 155a, 155b of the output device. In this manner, when the hand wheel 210 of the valve 200 is operated, the actuator 145 of the output device 140 moves along the auger 144, which in turn causes the guide 150 to move linearly along the tracks 152a, 152b. The output device 140 also includes a reciprocating motion mechanism for converting the linear motion of the guide into rotational motion. Such a reciprocating motion mechanism is also known as Scotch Yoke or a slotted link mechanism. The reciprocating motion mechanism comprises an adjustable mating block 157 located within a lever 158. As shown in FIG. 20, the adjustable mating block 157 mates with the pin, which is adapted to fit and move freely within the adjustable mating block 157. The lever 158 may be secured and positioned in the center of an enclosure of the output device 140. The lever 158 has an adjustment mechanism 159 that allows the mating block 157 to be adjusted so its length is proportional to travel of the valve from the fully open position to the fully closed position.

As shown in FIG. 17, to facilitate connection to a NAMUR 1 device such as a valve position indicator, an adapter plate 170 may be connected to the output device 140. The adapter plate 170 comprises a mounting plate defining holes 171 that are in a NAMUR 1 configuration. A NAMUR 1 adapter 172 and a lever 173 may be part of an enclosure of or affixed to the top of the output device 140.

The output device 140 may also include a calibration mechanism as shown in FIG. 16. The calibration mechanism comprises a slot or window and a visual scale, which is used in connection with the auger 145. Similarly, as shown in FIG. 17, the adapter plate can include a slot or window with a visual scale, which is used in connection with the adjustable mating block located within a lever of the reciprocating motion mechanism. Using the two visual scales, the device can be calibrated so as to ensure that the actual linear travel of the valve 200 is calibrated to the angular movement of the NAMUR 1 shaft as shown in FIG. 17. The actual linear travel of the valve 200 is represented on the visual scale of the auger as shown in FIG. 16. The scaled measurement is directly proportional to the actual linear travel of the valve 200, where the number of turns of the hand wheel 210 is converted through the series of gears 1 (e.g., the first gear 122, the second gear 124, the third gear 126 and the fourth gear 128) of the mechanical mechanism 120 to be able to be viewed within a pre-determined range, e.g., about 2 inches.

The gear ratio conversion of the mechanical mechanism 120 has two primary functions (1) it reduces the numbers of turns of the valve 200 for an ultra-compact rotary sensor to be able to be used which has a number of turns in the range of from about 50 to about 100 turns; and (2) the auger 145 (e.g., an auger with about a 32 threads per inch) count is configured to display the scaled linear travel within about a 2" range plus provide a shorter length of the lever to fit into a compact output device 140. With these two primary functions, the output device 140 can be utilized as an universal output device for a full range of valves (e.g., from 2" to 12" valves or greater) due to its compact size and the capability of being mounted remotely. The two primary measurements should be matched so as to calibrate the linear travel of the valve 200 to the angular movement where an adjustment of the mating block within the level attached to the NAMUR 1 shaft must be made. To adjust the mating block within the lever, an adjuster, such as a screw plug, is located above the visual scale on the side plate of the output device 140 in FIG. 16. When the valve 200 is in the center of the valve travel, the adjustment screw lines up with the adjustment hole. The adjustment screw fabricated within the lever is turned clockwise and/or counter clockwise. When turned the adjustment screw moves the mating block which in turn moves the carriage 153 along the guide to the correct measurement to match the measurement of actual proportioned valve travel viewed through the slot or window as shown in FIG. 16. When these two measurements equal or substantially equal the mechanical mechanism with the auger representing the linear movement is calibrated to produce the angular movement between 0 degrees and 90 degrees of the quarter-turn output device. After this calibration process is completed, the quarter-turn output device should provide a repeatable movement for any third-party NAMUR 1 device that provides a visual indication and/or open or close discrete off/on signal via the limit switches and/or analog signal via a potentiometer to be connected to a control system via a wired or wireless connection or both. An example of a commercially available NAMUR 1 valve indicator 300 (as shown in FIG. 3) is StoneL Quartz® explosion-proof (QX), non-incendive and intrinsically safe (QN) and general purpose (QG) valve monitoring solutions, which is commercially available from StoneL/Metso having an address of 26271 US Highway 59, Fergus Falls, MN 56537. Adjustment to the measurement is typically only required when the internal components for the valve wear, the valve is repaired, and/or the mechanical mechanism and output device is moved and installed onto another valve. The output device is self-contained with all of the internal parts intact and does not require opening unless the internal components need to be replaced.

In operation, as the hand wheel 210 of the valve 200 is operated, the first gear 122 rotates, which in turn causes movement or rotation of the second support 129, which in turn rotates the shaft 142 of the output device 142 so as to cause the actuator 145 to move linearly along the auger 144 of the output device. In this manner, the carriage 153 glides along the guide 150 and the mating block within the lever rotates slowly within a quarter turn movement from a 0 degree position to a 90 degree position. The quarter turn movement may be referred to as "Scotch Yoke" type movement that converts into an open or close indication within the NAMUR 1 device that may be mounted on top of the output device. The NAMUR 1 device fits on top of the NAMUR 1 adapter 172 and is connected to the output device using one or more fasteners or connecters in connection with the holes of the adapter plate 170.

As shown in FIG. 15, the output device 140 may further include a rotary sensor 141, one or more limit switches 146, or both. In this manner, the output device 140 can provide the percent of the position of the valve, an open or close position, a local indication where the valve 200 is installed of the position of the valve 200, for example, using an external NAMUR 1 indicator mounted to the adapter 170 of the output device 140. The output device 140 may also be located remotely from the valve by connecting the output device 140 to the mechanical mechanism via a flexible shaft 161 as described herein. The output device 140 may include an output connection 143 to enable the output device 140 to transmit a signal indicative of the
position of the valve 200 to a control system via a wired connection, a wireless connection, or both.

In an aspect, a wireless valve position indication sensor 180 may be embedded within an open closed visual indicator 182 mounted onto the NAMUR 1 adapter 172 on the top of the adapter plate 170 of the output device 140. The wireless indication sensor 180 uses a 3-axis accelerometer to detect the angle between 0 degrees and 90 degrees. The 3-axis accelerometer is based on a microchip sensor that measures differential capacitance that occurs as acceleration takes place. The signal is transformed into a voltage which then communicates to a wireless gateway. The 3-axis accelerometer is designed to measure acceleration along the three axes in space—the forward and back X-axis, the left and right Y-axis, and the up and down Z-axis. Depending on the mounting configuration of the output device 140, the lower-level C language firmware converts this acceleration into angles of each axes. These angles are transmitted within data registers from the micro-controller within the wireless sensor wirelessly to the gateway then out a communication network protocol (e.g. Ethernet/IP, Profinet, ModbusTCP, and so forth) to a control system. According to the orientation of the output device 140, the micro-processor identifies, which of two axes or two-dimensional plane the quarter-turn movement is oriented and provides a value of angle between about 0 degrees and about 90 degrees. The value or data register is then scaled to 0 percent to 100 percent open or close position of the valve plus the states of the position of the valve of a fully open or fully closed are determined via programming within the control system or locally within the wireless sensor's micro-controller.

II. Methods for Providing a Position of a Valve

Methods for indicating the position of a valve are disclosed herein. In an aspect, a method for indicating the position of a valve comprises (A) operatively connecting the device described above to a valve having a hand wheel. The method may further comprise (B) calibrating the device as described above.

The subject matter is described above with reference to numerous aspects and specific examples. Many variations will suggest themselves to those skilled in the art in light of the above detailed description. All such obvious variations are within the full intended scope of the appended claims. Other aspects of the subject matter disclosed herein can include, but are not limited to, the following (aspects are described as "comprising" but, alternatively, can "consist essentially of", or "consist of"):

Aspect 1. A device for indicating the position of a valve, the device comprising:
(A) a mechanical mechanism comprising: (i) a first gear configured to operatively connect to the valve; (ii) a second gear coupled to a first end portion of a first support, wherein the second gear is sized and configured so as to mate with the first gear; (iii) a third gear coupled to a second end portion of the first support; (iv) a fourth gear coupled to a first end portion of a second support, wherein the fourth gear mates with the third gear; and (v) a support member for supporting the first support and the second support, and adapted to affix the mechanical mechanism to the valve; and (B) an output device operatively connected to the mechanical mechanism, wherein the output device provides a signal that is indicative of the position of the valve.

Aspect 2. A device as defined in Aspect 1 wherein the output device is operatively connected to a second end portion of the second support.

Aspect 3. A device for indicating the position of a valve as defined in any of Aspects 1-2, wherein the output device comprises one selected from the group consisting of a rotary sensor, two limit switches, a quarter turn indicator, and any combination of two or more of the foregoing.

Aspect 4. A device for indicating the position of a valve as defined in any of Aspects 1-3, wherein the output device is operatively connected to the second end portion of the second support with a coupling and a flexible shaft.

Aspect 5. A device for indicating the position of a valve as defined in Aspect 4, wherein the flexible shaft has a length in the range of from about 1 to about 20 feet.

Aspect 6. A device for indicating the position of a valve as defined in any of Aspects 1-5, wherein the device for indicating the position of the valve is operatively coupled to a hand wheel of the valve so as to provide a signal that is indicative of the position of the valve when the valve is actuated.

Aspect 7. A device for indicating the position of a valve as defined in any of Aspects 1-6, wherein a longitudinal axis of the second gear is substantially orthogonal relative to a longitudinal axis of the first gear.

Aspect 8. A device for indicating the position of a valve as defined in any of Aspects 1-7, wherein a longitudinal axis of the third gear is substantially orthogonal relative to a longitudinal axis of the fourth gear.

Aspect 9. A device for indicating the position of a valve as defined in any of Aspects 1-8, wherein the output device comprises a rotary sensor coupled to the second end portion of the second support, wherein the rotary sensor has a number of turns in the range of from about 50 to about 100 turns and transmits a signal indication of a position of the manual valve.

Aspect 10. A device for indicating the position of a valve as defined in any of Aspects 1-9, wherein the mechanical mechanism is positioned adjacent or below a hand wheel of the valve.

Aspect 11. A device for indicating the position of a valve as defined in any of Aspects 1-0, wherein a position indicator sensor is operatively connected to the output device and receives the signal that is indicative of a position of the valve and in response to the signal provides an indication of the position of the valve.

Aspect 12. A device for indicating the position of a valve as defined in any of Aspects 1-1, wherein a wireless position indicator sensor is operatively connected to the output device and receives the signal that is indicative of a position of the valve and in response to the signal provides an indication of the position of the valve.

Aspect 13. A method for indicating the positon of a valve, the method comprising:
(A) operatively connecting the device of claim 1 to a valve having a hand wheel.

Aspect 14. The method for indicating the positon of a valve as defined in Aspect 13, wherein the device is operatively coupled to the hand wheel of the valve and positioned adjacent to or below the hand wheel of the valve.

Aspect 15. A device for indicating a position of a valve comprising:
(A) a mechanical mechanism comprising: (i) a first gear configured to operatively connect to the valve; (ii) a second gear operatively connected to the first gear, wherein the second gear is sized and configured so as to mate with the first gear; (iii) a third gear operatively connected to the second gear; (iv) a fourth gear operatively connected to the third gear; and (v) a member for supporting the each of the gears, and adapted to affix the mechanical mechanism to the valve; and
(B) an output device operatively connected to the mechanical mechanism, wherein the output device provides a signal that is indicative of the position of the valve.

Aspect 16. A mechanical mechanism for use with a valve, the mechanical mechanism comprising:
(A) a first gear configured to operatively connect to the valve;
(B) a second gear coupled to a first end portion of a first support, wherein the second gear is sized and configured so as to mate with the first gear;
(C) a third gear coupled to a second end portion of the first support;
(D) a fourth gear coupled to a first end portion of a second support, wherein the fourth gear mates with the third gear; and
(E) a support member for supporting the first support and the second support, and adapted to affix the mechanical mechanism to the valve;
wherein the mechanical mechanism is configured to be operatively connected to an output device capable of producing a signal that is indicative of the position of the valve.

Aspect 17. An output device for use with a valve, the output device comprising: (A) at least one sensor comprising a rotary sensor, two limit switches, a quarter turn indicator, position indicator sensor and any combination of two or more of the foregoing; wherein the output device is configured to receive a mechanical input as the hand wheel of the valve is operated and in response provide a signal that is indicative of the position of the valve.

Aspect 18. An output device as defined in Aspect 17 further including a position indicator sensor that is operatively connected to the at least one sensor, wherein the position indicator sensor receives the signal that is indicative of a position of the valve and in response to the signal provides an indication of the position of the valve.

Aspect 19. An output device as substantially described herein.

Aspect 20. A mechanical mechanism as substantially described herein.

Aspect 21. A device for indicating a position of a valve as substantially described herein.

Aspect 22. A method for calibrating device for indicating a position of a valve as substantially described herein.

The invention claimed is:
1. A device for indicating a position of a valve comprising:
a mechanical mechanism comprising:
a first gear configured to operatively connect to the valve;

a second gear located on and coupled to a first end portion of a first support shaft, wherein the second gear is sized and configured so as to mate with the first gear such that the second gear is positioned orthogonal relative to the first gear;

a third gear located on and coupled to a second end portion of the first support shaft;

a fourth gear coupled to a first end portion of a second support, wherein the fourth gear mates with the third gear such that the fourth gear is positioned orthogonal relative to the third gear; and a support member for supporting the first support shaft and the second support, and adapted to affix the mechanical mechanism to the valve; and an output device operatively connected to the mechanical mechanism, wherein the output device provides a signal that is indicative of the position of the valve.

2. The device of claim 1 wherein the output device is operatively connected to a second end portion of the second support.

3. The device of claim 2 wherein the output device comprises one selected from the group consisting of a rotary sensor, two limit switches, a quarter turn indicator, and any combination of two or more of the foregoing.

4. The device of claim 2 wherein the output device is operatively connected to the second end portion of the second support with a coupling and a flexible shaft.

5. The device of claim 4 wherein the flexible shaft has a length in the range of from about 1 to about 20 feet.

6. The device of claim 1 wherein the device for indicating the position of the valve is operatively coupled to a hand wheel of the valve so as to provide a signal that is indicative of the position of the valve when the valve is actuated.

7. The device of claim 1 wherein a longitudinal axis of the second gear is substantially orthogonal relative to a longitudinal axis of the first gear.

8. The device of claim 7 wherein a longitudinal axis of the third gear is substantially orthogonal relative to a longitudinal axis of the fourth gear.

9. The device of claim 1 wherein the output device comprises a rotary sensor coupled to the second end portion of the second support, wherein the rotary sensor has a number of turns in the range of from about 50 to about 100 turns and transmits a signal indication of a position of the manual valve.

10. The device of claim 1 wherein the mechanical mechanism is positioned adjacent or below a hand wheel of the valve.

11. The device of claim 1 wherein a position indicator sensor is operatively connected to the output device and receives the signal that is indicative of a position of the valve and in response to the signal provides an indication of the position of the valve.

12. The device of claim 1 wherein a wireless position indicator sensor is operatively connected to the output device and receives the signal that is indicative of a position of the valve and in response to the signal provides an indication of the position of the valve.

13. A device for indicating a position of a valve comprising:
a mechanical mechanism comprising:
a first gear configured to operatively connect to the valve;
a second gear operatively connected to the first gear, wherein the second gear is sized and configured so as to mate with the first gear such that the second gear is positioned orthogonal relative to the first gear;
a third gear operatively connected to the second gear, wherein the second gear and the third gear are each located on a rod;
a fourth gear operatively connected to the third gear such that the fourth gear is positioned orthogonal relative to the third gear; and
a member for supporting the each of the gears, and adapted to affix the mechanical mechanism to the valve; and
an output device operatively connected to the mechanical mechanism, wherein the output device provides a signal that is indicative of the position of the valve.

14. A mechanical mechanism for use with a valve, the mechanical mechanism comprising:
a first gear configured to operatively connect to the valve;
a second gear located on and coupled to a first end portion of a first support rod, wherein the second gear is sized and configured so as to mate with the first gear such that the second gear is positioned orthogonal relative to the first gear;
a third gear located on and coupled to a second end portion of the first support rod;
a fourth gear coupled to a first end portion of a second support, wherein the fourth gear mates with the third gear such that the fourth gear is positioned orthogonal relative to the third gear; and
a support member for supporting the first support rod and the second support, and adapted to affix the mechanical mechanism to the valve,
wherein the mechanical mechanism is configured to be operatively connected to an output device capable of producing a signal that is indicative of the position of the valve.

* * * * *